UNITED STATES PATENT OFFICE.

JOHN J. BURCHENAL, OF CINCINNATI, OHIO, ASSIGNOR, BY MESNE ASSIGNMENTS, TO THE HYDROGENATION COMPANY, OF CINCINNATI, OHIO, A CORPORATION OF OHIO.

PROCESS OF MAKING A NICKEL CATALYST.

1,226,945.  Specification of Letters Patent.  Patented May 22, 1917.

No Drawing.  Application filed February 23, 1912.  Serial No. 679,536.

*To all whom it may concern:*

Be it known that I, JOHN J. BURCHENAL, a citizen of the United States, and a resident of the city of Cincinnati, in the county of Hamilton and State of Ohio, have invented certain new and useful Improvements in Processes of Making a Nickel Catalyst, of which the following is a specification.

This invention relates to the production of finely-divided metallic nickel for use as a catalyzer, a product of uniform and high activity being obtained by the reduction to chemically-precipitated nickel carbonate.

According to the preferred method, a soluble nickel salt, *e. g.*, the sulfate, is dissolved in water, and the carbonate is then precipitated, as by the addition of sodium carbonate. The precipitate is removed, washed, dried and calcined to eliminate the carbon dioxid and thereby convert the carbonate into an oxid. Reduction to finely-divided nickel is then effected by heating the oxid in a current of hydrogen. To render the product non-pyrophoric, it may be cooled in an atmosphere of hydrogen or carbon dioxid.

The finely-divided nickel produced by this method has a high and uniform degree of activity, and is especially effective for the hydrogenation of unsaturated fatty acids and their esters.

I am aware that the prior art describes the production of nickel-powder catalyzers by reducing nickel carbonate, other than the chemically-precipitated carbonate; also the plating of particles of an inert carrier, such as kieselguhr, with a film of nickel reduced from chemically-precipitated nickel carbonate. The present invention is directed specifically to the production of finely-divided nickel, without a carrier, and is based on my discovery that such nickel powder is most effective when reduced from the chemically-precipitated carbonate.

I claim:

1. The process of making a nickel catalyzer, which consists in preparing a chemically-precipitated nickel compound free from inert components by reaction between a dissolved nickel salt and a soluble carbonate, calcining the precipitate, and thereafter reducing the calcined product while free from admixture with non-reducible materials, whereby a catalyzer of high and uniform activity is produced.

2. The process of making a nickel catalyzer, which consists in preparing a chemically-precipitated nickel compound free from inert components by reaction between a dissolved nickel salt and sodium carbonate, calcining the precipitate, and thereafter reducing the calcined product while free from admixture with non-reducible materials, whereby a catalyzer of high and uniform activity is produced.

JNO. J. BURCHENAL.

Witnesses:
MARSTON ALLEN,
HELEN AICHHOLZ.